(12) United States Patent
Mazurenko et al.

(10) Patent No.: US 8,804,672 B2
(45) Date of Patent: Aug. 12, 2014

(54) CHUNK-BASED DOUBLE-DWELL PREAMBLE DETECTION

(71) Applicant: LSI Corporation, Milpitas, CA (US)

(72) Inventors: Ivan L. Mazurenko, Khimki (RU);
Alexander A. Petyushko, Bryansk (RU);
Meng-Lin Yu, Morganville, NJ (US);
Jian-Guo Chen, Basking Ridge, NJ (US)

(73) Assignee: LSI Corporation, San Jose, CA (US)

( * ) Notice: Subject to any disclaimer, the term of this patent is extended or adjusted under 35 U.S.C. 154(b) by 99 days.

(21) Appl. No.: 13/686,205

(22) Filed: Nov. 27, 2012

(65) Prior Publication Data

US 2013/0279404 A1    Oct. 24, 2013

(30) Foreign Application Priority Data

Apr. 24, 2012  (RU) .................................. 2012116579

(51) Int. Cl.
*H04B 7/216* (2006.01)
*H04W 8/18* (2009.01)

(52) U.S. Cl.
CPC ..................................... *H04W 8/18* (2013.01)
USPC ............ 370/335; 370/328; 370/341; 375/150

(58) Field of Classification Search
USPC .......................... 370/342, 335, 341, 329, 328
See application file for complete search history.

(56) References Cited

U.S. PATENT DOCUMENTS

| | | | |
|---|---|---|---|
| 7,133,387 B2 * | 11/2006 | Nakada | 370/335 |
| 7,349,375 B2 | 3/2008 | Gerakoulis | |
| 7,656,837 B2 | 2/2010 | Gerakoulis | |
| 7,869,482 B2 | 1/2011 | Kubota et al. | |
| 8,583,152 B2 * | 11/2013 | Ishii et al. | 455/501 |
| 2001/0043582 A1 * | 11/2001 | Nakada | 370/335 |

(Continued)

FOREIGN PATENT DOCUMENTS

| | | |
|---|---|---|
| WO | WO2007010331 A1 | 1/2007 |
| WO | WO2007104362 A1 | 9/2007 |
| WO | WO2008057584 A2 | 5/2008 |

OTHER PUBLICATIONS

"3rd Generation Partnership Project; Technical Specification Group Radio Access Network; Physical Channels and Mapping of Transport Channels Onto Physical Channels (FDD)," 3GPP (3rd Generation Partnership Project) TS 25.211 V9.1.0 (Dec. 2009) Technical Specification.

(Continued)

*Primary Examiner* — Dady Chery
(74) *Attorney, Agent, or Firm* — Mendelsohn, Drucker & Dunleavy, P.C.; Craig M. Brown; Steve Mendelsohn

(57) ABSTRACT

In one embodiment, the invention is a method for performing preamble detection in a wireless communication network. The method performs a first dwell, wherein non-overlapping chunks of received data are processed to generate partial correlation values for each possible combination of a signature code and delay. Candidate selection is performed by comparing each of the partial correlation values to a candidate-selection threshold. For each detected candidate, the chunks of received data are processed to generate full correlation values. Each full correlation value is then compared to a preamble-detection threshold to detect a transmitted signature. Generating full correlation values for only the selected candidates reduces the computation complexity over prior-art methods that generate full correlation values for all signatures at all delays.

21 Claims, 14 Drawing Sheets

(56) References Cited

U.S. PATENT DOCUMENTS

| | | |
|---|---|---|
| 2002/0101835 A1 | 8/2002 | Gerakoulis |
| 2004/0202137 A1 | 10/2004 | Gerakoulis |
| 2008/0219220 A1 | 9/2008 | Gerakoulis |
| 2009/0257421 A1 | 10/2009 | Nakashima et al. |
| 2010/0027592 A1 | 2/2010 | Arviv et al. |
| 2010/0067511 A1 | 3/2010 | Peters |
| 2010/0255867 A1* | 10/2010 | Ishii et al. ............ 455/501 |
| 2011/0002249 A1 | 1/2011 | Gerakoulis |
| 2011/0080902 A1 | 4/2011 | Jang |
| 2011/0170421 A1 | 7/2011 | Gerakoulis |
| 2012/0295657 A1* | 11/2012 | Okazaki ............ 455/524 |
| 2013/0070867 A1* | 3/2013 | To et al. ............ 375/267 |
| 2013/0195007 A1* | 8/2013 | Mazurenko et al. ...... 370/328 |

OTHER PUBLICATIONS

"3rd Generation Partnership Project; Technical Specification Group Radio Access Network; Multiplexing and channel Coding (FDD)," 3GPP (3rd Generation Partnership Project) TS 25.212 V7.9.0 (Sep. 2008) Technical Specification.

"3rd Generation Partnership Project; Technical Specification Group Radio Access Network; Spreading and Modulation (FDD)," 3GPP (3rd Generation Partnership Project) TS 25.213 V9.2.0 (Sep. 2010) Technical Specification.

"3rd Generation Partnership Project; Technical Specification Group Radio Access Network; Physical Layer Procedures (FDD)," 3GPP (3rd Generation Partnership Project) TS 25.219 V9.2.0 (Mar. 2010) Technical Specification.

\* cited by examiner

```
                                                                    400
1   Initialization step:
2   sum = 0;
3   num_CAS_steps = M/CAS;
4   num_candidates = 0; // total number of (s,lag) candidate pairs
5   first_dwell_profile_counter = num_first_dwell;
6
7   for k=1..num_employed_signatures
8     s = employed_signatures(k);
9     for lag=1..max_lag
10       profile(k, lag) = 0;
11       profile_counter(k, lag) = 0;
12    end
13  end
```

FIG. 4

```
                                                                    500
1   Post processing step // done for t=5120/M
2   threshold2 = C2 * sum / num_candidates;
3   for k=1..num_employed_signatures
4     s = employed_signatures(k);
5     for lag=1..max_lag
6        if candidate(k, lag) && profile(k, lag)>threshold2 // signature s is detected at delay lag!
7        end
8     end
9   end
```

FIG. 5

```
1   Processing Step (first dwell, candidate selection, and second dwell)
2   for antenna chunk x_t, t=1..5120/M
3      for k=1..num_employed_signatures
4         s = employed_signatures(k);
5         for lag=1..max_lag
6            for j=1..num_CAS_steps  // j corresponds to coherent accumulation window index
7               CA = 0; CA_lookahead = 0;
8               for n=0..CAS-1  // n stands for a relative index inside coherent accumulation frame
9                  i = (j-1)*CAS + n;  // i stands for absolute index of a chip in preamble pattern
10                 i0 = lag + i - (t-1)*M;  // i0 stands for an index of a lag-shifted chip relative to a beginning
11                       of a chunk
12                 if profile_counter(k, lag) < first_dwell_profile_counter // first dwell processing
13                    if (i0>=0 && i0<M) // bounds checking –checking if i0 is inside the chunk
14                       CA += x_t[i0] * c_pre_n_s[i];
15                       profile_counter(k, lag) = profile_counter(k, lag)+1;
16                    elseif (i0>=M && i0<M*2) // bounds checking –checking if i0 is inside the next chunk
17                          (using M chips lookahead)
18                       CA_lookahead += x_t[i0] * c_pre_n_s[i];
19                       profile_counter(k, lag) = profile_counter(k, lag)+1;
20                    end
21                 else if profile_counter(k, lag)==first_dwell_profile_counter // first dwell candidate
22                          selection:
23                    candidate(k, lag) = (profile(k, lag)+abs(CA+CA_lookahead))>threshold4_1;
24                    num_candidates = num_candidates + candidate(k, lag);
25                    profile_counter(k, lag) = profile_counter(k, lag)+1; // to avoid double processing
26                 else if candidate(k, lag) && (i0>=0 && i0<M) // bounds checking profile accumulation
27                          for the second dwell candidates:
28                    CA += x_t[i0] * c_pre_n_s[i];
29                 end
30              end
31              profile(k, lag) += abs(CA);
32              if candidate(k, lag)
33                 sum += abs(CA);
34              end
35           end
36        end
37     end
38  end
```

```
1    Processing step – first dwell only
2    for antenna chunk x_t, t=1..5120/M
3      for k=1..num_employed_signatures
4        s = employed_signatures(k);
5        for lag=1..max_lag
6          for j=1..num_CAS_steps    // j corresponds to coherent accumulation window index
7            CA = 0; CA_lookahead = 0;
8            for n=0..CAS-1   //n stands for a relative index inside coherent accumulation frame
9              i = (j-1)*CAS + n; // i stands for absolute index of a chip in preamble pattern
10             i0 = lag + i - (t-1)*M; // i0 stands for an index of a lag-shifted chip relative to a
11   beginning of a chunk
12             if profile_counter(k, lag) < first_dwell_profile_counter // first dwell processing
13               if (i0>=0 && i0<M) // bounds checking –checking if i0 is inside the chunk
14                 CA += x_t[i0] * c_pre_n_s[i];
15                 profile_counter(k, lag) = profile_counter(k, lag)+1;
16               elseif (i0>=M && i0<M*2) // bounds checking –checking if i0 is inside the
17   next chunk (using M chips lookahead)
18                 CA_lookahead += x_t[i0] * c_pre_n_s[i];
19                 profile_counter(k, lag) = profile_counter(k, lag)+1;
20               end
21             end
22           end
23           profile(k, lag) += abs(CA);
24
25         end
26       end
27     end
28   end
```

```
1   candidate selection for option 2a (dynamically adjusted threshold for each signature)
2   for k=1..num_employed_signatures
3       s = employed_signatures(k);
4       // sort profile values for the given s in descending order:
5       profile_sorted(s,...) = sort(abs(profile(s,...)), descending_order);
6       // adjust threshold to select the biggest values for the given s:
7       threshold4_2(s) = profile_sorted(s, [max_lag * first_dwell_fraction]);
8       for lag=1..max_lag
9           candidate(s, lag) = profile(s, lag)>threshold4_2(s);
10      end
11  end
```

```
1   Candidate selection for option 2b (global dynamically adjusted threshold)
2   // sort all profile vales for all signatures in descending order:
3   profile_sorted(...) = sort(abs(profile(...,...)), descending_order);
4   // adjust threshold to select the biggest values:
5   threshold4_3 = profile_sorted([max_lag*num_employed_signatures * first_dwell_fraction]);
6   for k=1..num_employed_signatures
7       s = employed_signatures(k);
8       for lag=1..max_lag
9           candidate(s, lag) = profile(s, lag)>threshold4_3;
10      end
11  end
```

FIG. 10

```
1    Second dwell for both options 2a and 2b
2    for antenna chunk x_t, t=1..5120/M
3       for k=1..num_employed_signatures
4          s = employed_signatures(k);
5          for lag=1..max_lag
6             for j=1..num_CAS_steps  // j corresponds to coherent accumulation window index
7                CA = 0; CA_lookahead = 0;
8                for n=0..CAS-1 // n stands for a relative index inside coherent accumulation frame
9                   i = (j-1)*CAS + n; // i stands for absolute index of a chip in preamble pattern
10                  i0 = lag + i - (t-1)*M; // i0 stands for an index of a lag-shifted chip relative to a
11   beginning of a chunk
12                  if candidate(k, lag) && (i0>=0 && i0<M) // bounds checking
13                     // profile accumulation for the second dwell candidates:
14                     CA += x_t[i0] * c_pre_n_s[i];
15                  end
16               end
17               profile(k, lag) += abs(CA);
18               if candidate(k, lag)
19                  sum += abs(CA);
20               end
21            end
22         end
23      end
24   end
25
```

FIG. 11

```
1   // first / second dwell profile accumulation
2   for antenna chunk x_t, t=1...5120/M
3      for k=1..num_employed_signatures
4         s = employed_signatures(k);
5         for lag=1..max_lag
6            for j=1..num_CAS_steps    // j corresponds to coherent accumulation window index
7               CA = 0;
8               for n=0..CAS-1         // n stands for a relative index inside coherent accumulation frame
9                  i = (j-1)*CAS + n; // i stands for absolute index of a chip in preamble pattern
10                 i0 = lag + i - (t-1)*M; // i0 stands for an index of a lag-shifted chip relative to a beginning of
11                    a chunk
12                 if profile_counter(k, lag) < first_dwell_profile_counter // first dwell processing
13                    if (i0>=0 && i0<M && i0<i)
14                       // bounds checking --check if i0 is inside the chunk and not in the excluded area
15                       CA += x_t[i0] * c_pre_n_s[i];
16                       profile_counter(k, lag) = profile_counter(k, lag)+1;
17                    end
18                 else if profile_counter(k, lag) > first_dwell_profile_counter // second dwell processing
19                    // profile accumulation for the second dwell candidates:
20                    CA += x_t[i0] * c_pre_n_s[i];
21                 end
22              end
23              profile(k, lag) += abs(CA);
24              if candidate(k, lag)
25                 sum += abs(CA);
26              end
27           end
28        end
29     end
30     // candidate selection for the first dwell
31     for k=1..num_employed_signatures
32        s = employed_signatures(k);
33        for lag=1..max_lag
34           if profile_counter(k, lag)==first_dwell_profile_counter
35              candidate(k, lag) = profile(k, lag) > threshold4_1;
36              num_candidates = num_candidates + candidate(k, lag);
37              profile_counter(k, lag) = profile_counter(k, lag)+1; // to avoid double processing
38           end
39        end
40     end
41  end
```

```
1   // first dwell profile accumulation
2   for antenna chunk x_t, t=1...5120/M
3       for k=1..num_employed_signatures
4           s = employed_signatures(k);
5           for lag=1..max_lag
6               for j=1..num_CAS_steps    // j corresponds to coherent accumulation window index
7                   CA = 0;
8                   for n=0..CAS-1       // n stands for a relative index inside coherent accumulation frame
9                       i = (j-1)*CAS + n; // i stands for absolute index of a chip in preamble pattern
10                      i0 = lag + i - (t-1)*M; // i0 stands for an index of a lag-shifted chip relative to a
11   beginning of a chunk
12                      if profile_counter(k, lag) < first_dwell_profile_counter // first dwell processing
13                          if (i0>=0 && i0<M && i0<i)
14                              // bounds checking –check if i0 is inside the chunk and not in the excluded area
15                              CA += x_t[i0] * c_pre_n_s[i];
16                              profile_counter(k, lag) = profile_counter(k, lag)+1;
17                          end
18                      end
19                  end
20                  profile(k, lag) += abs(CA);
21
22              end
23          end
24      end
25  end
```

CHUNK-BASED DOUBLE-DWELL PREAMBLE DETECTION

CROSS-REFERENCE TO RELATED APPLICATIONS

The subject matter of this application is related to Russian patent application no. 2012102842 on Jan. 27, 2012, the teachings of which are incorporated herein by reference in their entirety.

BACKGROUND OF THE INVENTION

1. Field of the Invention

The present invention relates to signal processing, and, more specifically but not exclusively, to preamble detection for wide-band code-division multiple access (WCDMA) and other wireless standards.

2. Description of the Related Art

In WCDMA and other wireless standards, user equipment, such as cell phones, transmit preambles to inform base transceiver stations (BTSs) that the user equipment (UE) is willing to establish a connection to the network. In systems that adhere to the 3GPP standards, the preamble, which is transmitted on the physical random access channel (PRACH), is a 4,096-chip sequence comprising 256 repetitions of a 16-bit signature code. The 3GPP standard allows for up to 16 different signature codes, commonly referred to as the 16 Hadamard codes, and often, only a subset of the 16 possible signature codes is employed in a given system. Before transmitting, the signature code is scrambled using a long scrambling code. The scrambling code is constructed from scrambling sequences, and there are 8,192 PRACH preamble scrambling codes in total.

When transmitting a preamble, the user equipment randomly chooses one of the available signature codes, scrambles the signature with a preamble scrambling code, and transmits the resulting preamble at the beginning of a WCDMA Acquisition Indicator Channel (AICH) access slot. There are 15 access slots per two frames, and the slots are spaced 5,120 chips apart. The BTS typically does not know a priori which of the randomly chosen signature codes was used in constructing the preamble. Further, the BTS typically does not know the length of the propagation delay of the preamble (i.e., the delay between the time the preamble was transmitted and the time that the preamble is received) because the location of the user equipment within the cell in which the BTS resides is typically unknown to the BTS at the time a connection is requested.

Since the preamble is the first indication of the user equipment to the BTS, the BTS detects the user equipment by correlating received data at the beginning of each AICH access slot. PRACH preamble detection is typically performed by means of implementing a matched filter for each possible signature code in the subset of signature codes. In particular, the received data is correlated with all possible preambles for each signature code in the subset of signature codes and for each possible propagation delay for the cell. Although the particular preamble that was transmitted is not known a priori to the BTS, the BTS typically knows a priori all of the possible preambles that could have been transmitted. The result of these correlations is a correlation profile for each possible signature code, where each correlation profile has a number of values (herein referred to as "correlation profile values" or simply "profile values") that is equal to the number of possible delays. In other words, the total number of correlation profiles is equal to the number of possible signature codes, and the total number of correlation profile values is equal to the number of possible signature codes times the number of possible delays. The correlation profile value for signature s and delay lag may be represented as shown in Equation (1):

$$\text{profile}(s, lag) = \left\| \sum_{i=0}^{L-1} sm_i c_{s,i} x_{i+lag} \right\| \quad (1)$$

where $sm_i$ is the ith chip of the scrambling code multiplied by $$e^{j(\frac{\pi}{4} + \frac{\pi}{2}i)},$$

$c_{s,i}$ is the ith chip of the signature code s, and $x_{i+lag}$ is the (i+lag)th chip of received data corresponding to possible delay lag. Note that here i is the chip index, not the square root of negative one, and L is the preamble length in chips (e.g., 4,096 chips).

After all correlation profiles are generated, each correlation profile value is compared to a preamble-detection threshold to detect the signature code that was transmitted and one or more possible propagation delays between the user equipment and the BTS. Each of the one or more possible propagation delays corresponds to a different propagation path of the transmitted preamble. The one or more possible propagation delays may then be provided to a path searcher component to detect the propagation delay of the propagation path that is received first in time. Discussions of preambles and preamble detection may be found in Third Generation Partnership Project (3GPP) Technical Specification (TS) 25.211 V9.1.0 (2009-12) "Physical Channels and Mapping of Transport Channels onto Physical Channels (FDD)," 3GPP TS 25.213 V9.1.0 (2009-12) "Spreading and Modulation (FDD)," and 3GPP TS 25.214 V9.2.0 (2010-03) "Physical Layer Procedures (FDD)," the teachings of all of which are incorporated herein by reference in their entirety.

When a relatively large number of signature codes are employed (e.g., all 16 Hadamard codes), separately performing the above-mentioned matched filter approach for each signature code becomes relatively computationally expensive. In this case, a more-efficient approach to detecting preambles may be employed that is based on the Fast Hadamard Transform. Such an approach is discussed in U.S. patent application publication number US2010/0067511, the teachings of which are incorporated herein by reference in their entirety.

As disclosed in U.S. patent application Ser. No. 12/304, 804, Equation (1) may be rewritten as shown in Equation (2):

$$\text{profile}(s, lag) = \left\| \sum_{r=0}^{15} \left[ c_{s,r} \sum_{l=0}^{L/16-1} sm_{16l+r} x_{16l+r+lag} \right] \right\| \quad (2)$$

where i=16l+r and r corresponds to one of the 16 bits in a signature sequence where r=0, . . . , 15. Equation (2) is derived from the fact that every signature s comprises 256 repetitions of a 16-bit sequence. As shown in Equation (2), the signature code $c_{s,r}$ is broken out into an outer-most summation. The inner-most summation is performed 16 times, once for each bit r of a 16-bit signature code sequence, to generate 16 partial sums. Essentially, Equation (2) divides the chips of received data x, and the corresponding chips of the scrambling code sm, into 16 streams, each stream corresponding to a different bit r of a 16-bit signature code sequence. The chips of received data x are split up and assigned to 16 streams such that received data chips $x_0, x_1, \ldots, x_{15}$ are distributed to streams 0, 1, ..., 15, respectively, received data chips $x_{16}, x_{17}, \ldots, x_{31}$ are distributed to streams 0, 1, . . . , 15, respectively, and so forth.

As a result of the signature code $c_{s,r}$ being broken out into an outer-most summation, the inner-most summation is independent of the signature codes, and therefore, the 16 partial sums that result from the inner-most summation may be reused for all 16 signature codes. The correlation profiles for all 16 signatures are derived by multiplying the 16×16 Hadamard Matrix with the 16 partial sums from the inner summation as shown in Equation (2). Such calculation may be accelerated by using the Fast Hadamard Transformation.

Even though the Fast Hadamard Transform approach is more efficient than the matched filter approach, the Fast Hadamard Transform approach still has a computational expense that is relatively high. This is due to the relatively large number of correlations that are performed across the numerous signature codes and delays. Therefore, there is a need for even more-efficient methods of preamble detection that reduce the total number of correlations that are needed to detect preambles without negatively impacting detection accuracy.

SUMMARY OF THE INVENTION

In one embodiment, the invention is a receiver-implemented method for detecting a preamble in a data signal transmitted from a transmitter and received at the receiver after a propagation delay. The method generates a plurality of partial-profile values based on a first set of one or more chunks of the data signal. Each chunk comprises multiple chips of the data signal. Further, each partial-profile value corresponds to a different combination of (i) a possible preambles of a set of different possible preambles and (ii) a possible propagation delay of a set of different possible propagation delays. Yet further, the plurality of partial-profile values corresponds to a set of the different combinations. The method selects a subset of the set of the different combinations as two or more candidates based on the partial-profile values. Each candidate corresponds to a different combination of a possible preamble and a possible propagation delay, and two or more of the plurality of partial-profile values are generated before selecting any of the two or more candidates. The method generates two or more full-profile values based on a second set of chunks of the data signal, wherein each full-profile value corresponds to a different selected candidate. The method detects the preamble based on the two or more full-profile values.

In another embodiment, the invention is an apparatus for detecting a preamble in a data signal transmitted from a transmitter and received at the receiver after a propagation delay. The apparatus comprises a partial-profile value generator, a candidate selector, a full-profile value generator, and a preamble detector. The partial-profile value generator is configured to generate a plurality of partial-profile values based on a first set of one or more chunks of the data signal. Each chunk comprises multiple chips of the data signal. Further, each partial-profile value corresponds to a different combination of (i) a possible preamble of a set of different possible preambles and (ii) a possible propagation delay of a set of different possible propagation delays. Yet further, the plurality of partial-profile values corresponds to a set of the different combinations. The candidate selector is configured to select a subset of the set of the different combinations as two or more candidates based on the partial-profile values. Each candidate corresponds to a different combination of a possible preamble and a possible propagation delay, and two or more of the plurality of partial-profile values are generated before selecting any of the two or more candidates. The full-profile value generator is configured to generate two or more full-profile values based on a second set of chunks of the data signal, wherein each full-profile value corresponds to a different selected candidate. The preamble detector is configured to detect the preamble based on the two or more full-profile values.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4 shows pseudo-code according to one embodiment of the present invention that may be used to implement an initialization step for chunk-based double-dwell preamble detection;

FIG. 6 shows pseudo-code according to one embodiment of the present invention that may be used to implement the processing step in FIG. 3;

FIG. 5 shows pseudo-code according to one embodiment of the present invention that may be used to implement a post-processing step for chunk-based double-dwell preamble detection;

FIG. 8 shows pseudo-code according to one embodiment of the present invention that may be used to implement the first-dwell processing sub-step in FIG. 7;

FIG. 9 shows pseudo-code according to one embodiment of the present invention that may be used to implement the candidate-selection sub-step in FIG. 7;

FIG. 10 shows pseudo-code according to another embodiment of the present invention that may be used to implement the candidate-selection sub-step in FIG. 7;

FIG. 11 shows pseudo-code according to one embodiment of the present invention that may be used to implement the second-dwell processing sub-step in FIG. 7;

FIG. 14 shows pseudo-code according to one embodiment of the present invention that may be used to implement the processing step in FIG. 13;

FIG. 16 shows pseudo-code according to one embodiment of the present invention that may be used to implement the first-dwell sub-step in FIG. 15.

DETAILED DESCRIPTION

Figure 1:
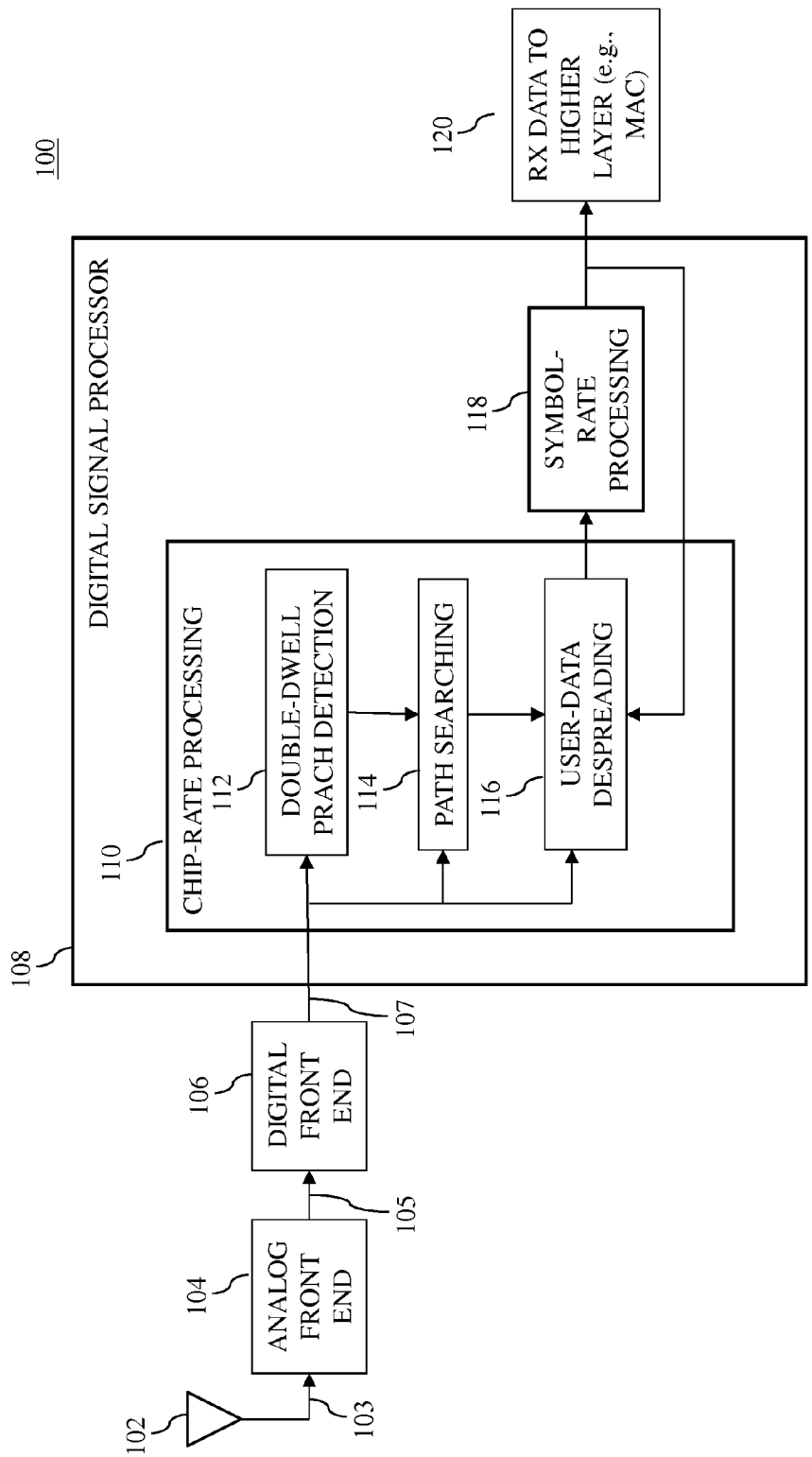
FIG. 1 shows a simplified block diagram of a receiver according to one embodiment of the present invention that may be used to implement chunk-based double-dwell preamble detection.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Conventional preamble-detection methods, such as those described in the background, perform preamble decisions on a slot-by-slot basis. In other words, these conventional methods do not perform preamble detection until after sufficient received data has been received to analyze an entire access slot. Thus, these methods generate the correlation profiles based on a number of chips of received data that is equal to the preamble length (e.g., 4,096 chips) plus a maximum possible preamble delay for the cell (i.e., max_lag). Then, only after all of the 4,096+max_lag chips have been processed, the correlation profile values of each correlation profile are compared to the preamble-detection threshold to detect the transmitted signature.

The 3GPP standard prohibits the latency of the preamble-detection operation from exceeding 7,680 chips. Thus, if the maximum delay for the cell is greater than 7,680 chips−4,096 chips=3,584 chips, which corresponds to a cell size of 3,584 chips/25.6=140 km, where 25.6 is the number of chips that travel 1 km round trip (i.e., 2 km) at the speed of light, then the latency requirements of the 3GPP standard cannot be met. As an alternative to performing preamble detection on a slot-by-slot basis, Russian patent application no. 2012102842 proposes methods for performing preamble detection on an incremental basis, where incremental preamble decisions are made before accumulating all 4,096+max_lag chips. According to these methods, preamble decisions are made for a limited delay range before all 4,096+max_lag chips are available. To accommodate these incremental preamble decisions, non-overlapping chunks of the received data are processed, where each chunk has M chips of received data, M is less than 4,096+max_lag chips in length, and preamble detection is performed after each chunk is processed.

This disclosure proposes another use of non-overlapping chunks of received data, where the non-overlapping chunks are used to perform double-dwell processing to detect preambles. Double-dwell processing involves performing a first pass (i.e., the first dwell) in which only a portion (e.g., <4096 chips) of the received data is processed to generate partial correlation profile values. A set of candidates is selected from the partial correlation profile values, and a second pass (i.e., the second dwell) is performed in which full correlation profile values are generated based on the full received data for only the selected candidates. The transmitted signature at one or more possible delays is then detected based on the full correlation profile values for the selected candidates. By performing the full correlations for only a limited number of candidates, the present invention may reduce the computational complexity of preamble detection over prior-art methods that perform full correlations for all of the correlation profile values.

FIG. 1 shows a simplified block diagram of a receiver 100 according to one embodiment of the invention that may be used to implement chunk-based double-dwell preamble detection. Receiver 100 receives an incoming data-modulated analog signal 103 via antenna 102 and processes the analog signal using analog front end 104. Analog front end 104, which performs processing such as radio-frequency processing, filtering, amplifying, and analog-to-digital conversion, provides a digital signal 105 to digital front end 106. Digital front end 106, which performs processing such as demodulation, filtering, down sampling, and carrier extraction, provides a demodulated signal 107 to digital signal processor 108, which performs chip-rate processing 110 and symbol-rate processing 118. Chip-rate processing 110 processes the demodulated digital signal in a chip-rate domain (e.g., two times a 3.84 MHz oversampling rate) using processing such as double-dwell PRACH detection 112, path searching 114, channel estimation and timing and frequency offset estimation (not shown), and user-data despreading 116.

PRACH detection 112 detects random access requests from new users by detecting transmitted preambles, and possible multi-path delays (each path is known as a finger) of those users. As described in further detail below, random access request detection is performed by processing the demodulated data signal received from digital front end 106 in non-overlapping chunks. In processing the non-overlapping chunks, PRACH detection module 112 performs a first pass (i.e., first dwell) where only a limited number of correlations (i.e., partial correlations) are performed for each possible profile value. PRACH detection module 112 selects candidate preambles based on these partial-profile values and performs a second pass (i.e., second dwell) in which the full correlations are performed to generate full correlation values for the selected candidates. A random access request is then detected by detecting a transmitted preamble from the full correlation values for the selected candidates.

Path searching 114 computes and tracks multi-path delays for each existing user based on profile values received from PRACH detection module 112. Channel estimation and timing and frequency offset estimation (not shown) estimates the channel characteristics and timing and frequency offsets for each user. Channel estimation and timing and frequency offset estimation may be part of the user-data despreading module 116. User-data despreading 116 despreads the received data and determines the data symbols that were most likely transmitted by each user based on the path delays and channel characteristics. Note that each symbol is spread at the transmitter by a channel code and can comprise, for example, 2 chips through 512 chips. Symbol-rate processing 118 reformats the received data to its original form, using, for example, deinterleaving and de-rate matching. Further, symbol-rate processing 118 performs decoding based on the particular error-correction code used by the transmitter. Yet further, symbol-rate processing 118 may also recombine data from previous partial, unsuccessful transmissions, if such unsuccessful transmissions occurred. The received data is then passed on to a higher layer 120 for further processing.

Chunk-Based Double-Dwell Preamble Detection Using Look-Ahead Data

Figure 2:
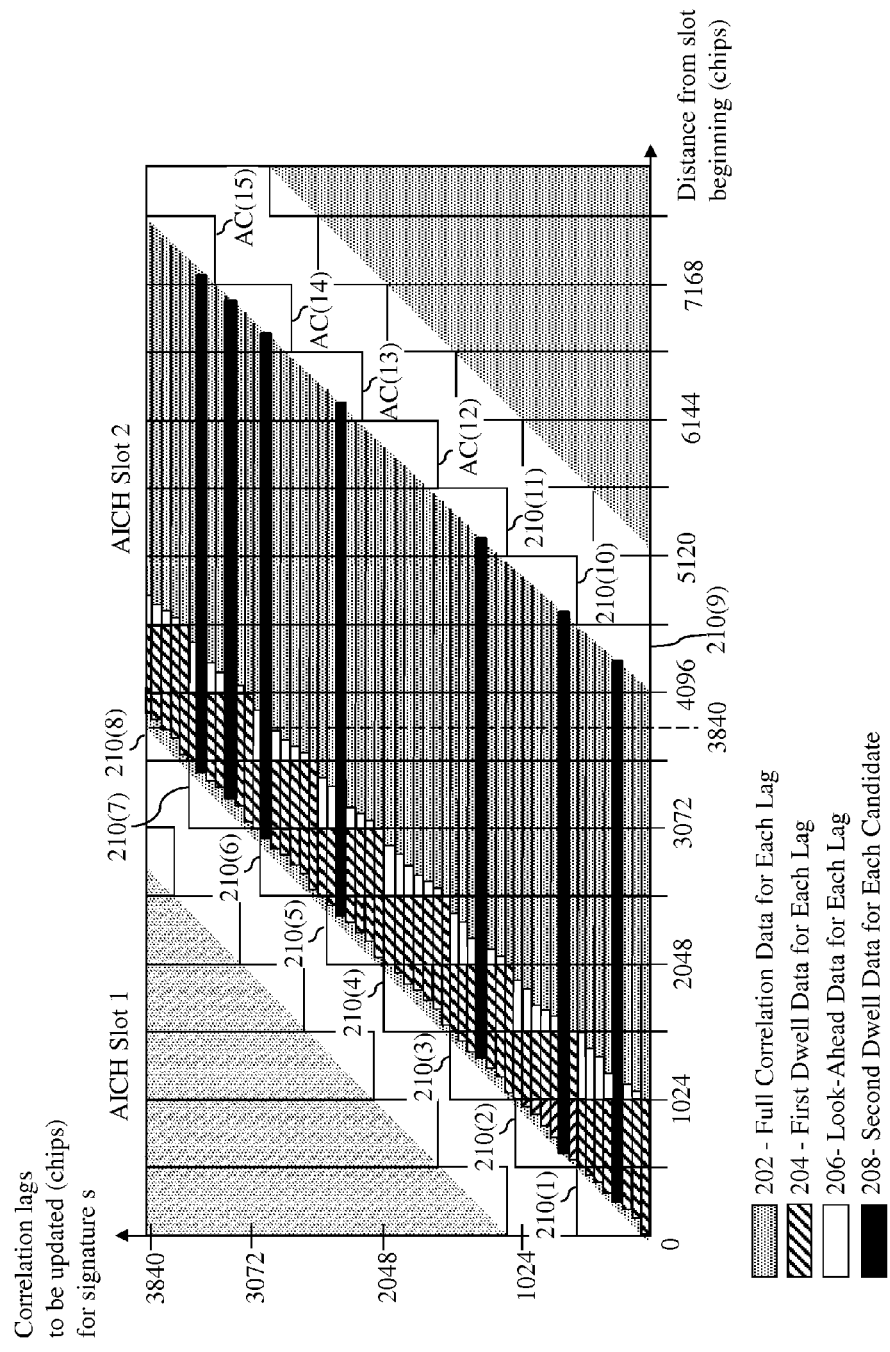
FIG. 2 is a graphical representation of an exemplary double-dwell preamble detection according to one embodiment of the present invention that uses look-ahead data.

FIG. 2 is a graphical representation of an exemplary double-dwell preamble detection according to one embodiment of the present invention that uses look-ahead data. The chip indexes i of the received data relative to the beginning of an access slot (i.e., AICH slot 2) are plotted along the horizontal axis, where the chip index i increases as the distance from the beginning of the access slot increases. The delays lag in chips for which correlations are performed (i.e., for which profile values are generated) are plotted along the vertical axis. Note that this graphical representation is for one signature s and similar representations may be generated for other signatures s.

Each horizontal bar 202 illustrates the received data that is needed when a full-profile value profile(s,lag) for a delay lag is generated. For example, for delay lag=1 (on the vertical axis), a window of chips 1 through 4,096 (along the horizontal axis) are used to generate a full-profile value profile(s,0); for delay lag=2, a window of chips 2 through 4,097 are used to generate a full-profile value profile(s,1); for delay lag=3, a window of chips 3 through 4,098 are used to generate a full-profile value profile(s,2); and so on. For purposes of this specification, these windows are considered "sliding windows" since the particular chips for each full-profile value profile(s,lag) varies from one delay lag to the next. Note that, preferably, each successive profile value profile(s,lag) corresponds to one chip of additional delay. Thus, each bar 202 should have a height equal to one chip, and there should be 512 bars 202 per 512 delays. However, for ease of illustration, each bar 202 has a height larger than one chip, and fewer than 512 bars 202 are shown per 512 delays. Assume for this discussion that each successive bar 202 corresponds to a delay of one additional chip.

Although not shown, these "sliding windows" may be broken up further into non-overlapping "sub-windows" of chips, referred to herein as coherent accumulation windows j. For example, in FIG. 2, for delay lag=1, the sliding window of 4,096 chips may be divided into a number of coherent accumulation windows j, where each coherent accumulation window j has CAS chips. A profile value profile(s,lag) may then be generated for the delay lag by (i) coherently accumulating the chips within each coherent accumulation window j to generate a coherent accumulation value CA for the coherent accumulation window j and (ii) summing the absolute values (i.e., non-coherently accumulating) of the coherent accumulation values CA for the coherent accumulation windows j.

Vertical rectangles 210(1)-210(15) illustrate the particular profile values profile(s,lag) that are updated for each chunk $x_t$ of received data, where each chunk $x_t$ has 512 chips of received data. For example, for the first chunk $x_t$ of received data (i.e., chips 1 through 512), profile values profile(s,lag) for delays lag=1, . . . , 512 are updated as illustrated by the portion of bars 202 within rectangle 210(1). For the second chunk $x_t$ of received data (i.e., chips 513 through 1,024), profile values profile(s,lag) for delays lag=1, . . . , 1,024 are updated as illustrated by the portion of bars 202 within rectangle 210(2). For the third chunk $x_t$ of received data (i.e., chips 1,025 through 1,536), profile values profile(s,lag) for delays lag=1, . . . , 1,536 are updated as illustrated by the portion of bars 202 within rectangle 210(3).

To illustrate the concept of a first dwell using look-ahead data, horizontal bars 204 and 206 are provided. Each bar 204 illustrates the chips of received data that are actually used to perform a partial correlation for one delay lag during the first dwell. For example, suppose that the first dwell consists of 1,024 chips and the chunk length is 512 chips. In this case, during the first dwell, partial-profile values profile(s,lag) for delays lag=1, . . . , 512 are updated as indicated by bars 204 based on the first chunk $x_t$ of received data (i.e., chips 1 through 512) and the second chunk $x_t$ of received data (i.e., chips 513 through 1,024).

Upon processing the second chunk $x_t$, each partial-profile value profile(s,lag) for delays lag=1, . . . , 512 could be compared to a candidate-selection threshold to determine whether or not the profile value corresponds to a candidate preamble. However, at this moment, the partial-profile values profile(s,lag) for delays lag=1, . . . , 512 have been generated based on correlations for different numbers of chips. For example, as indicated by the relative lengths of the respective bars 204, the partial-profile value profile(s,lag) for delay lag=1 has been generated based on correlations for 1,024 chips of received data (i.e., chips 1 through 1,024), while the partial-profile values profile(s,lag) for delays lag=2 through 1,024 have been generated based on correlations for fewer than 1,024 chips of received data. Preferably, candidate selection is made using partial-profile values profile(s,lag) that are generated based on the same number of chips.

To ensure that the partial-profile values profile(s,lag) for the first dwell are generated based on the same number of chips (e.g., 1,024 chips), look-ahead data may be used as indicated by horizontal bars 206. This look-ahead data is received from the next chunk $x_t$ of received data. For example, for delays lag=1 through 1,024, look-ahead data (as indicated by bars 206) from the third chunk $x_t$ of received data (i.e., chips 1,025 through 1,536) may be used such that each partial-profile value profile(s,lag) is generated based on correlations for 1,024 chips of received data. Note that, in alternative embodiments of the present invention, the first-dwell partial-profile values profile(s,lag) may be generated using a number of chips that is greater than or less than 1,024 chips.

Candidate selection may be made by comparing the partial-profile values profile(s,lag) to a candidate-selection threshold. If a partial-profile value profile(s,lag) exceeds the threshold, then the partial-profile values profile(s,lag) is selected as a candidate for second-dwell processing. Otherwise, the partial-profile value profile(s,lag) is not selected as a candidate, and no further processing is performed for the signature s at the delay lag. The candidate-selection threshold may be either a specified fixed threshold or a dynamically selected threshold. When using a fixed threshold, each partial-profile value profile(s,lag) may be compared to the threshold as soon as the partial-profile value profile(s,lag) is generated based on 1,024 chips. Thus, there is no need to wait until all of the partial-profile values profile(s,lag) have been generated before starting candidate selection. When using a dynamically selected threshold, candidate selection may have to wait until some or all of the partial-profile values profile(s,lag) are generated as discussed below.

Once the candidates have been selected, full correlations are performed for the candidates based on correlations for a full set of 4,096 chips. To illustrate this point, FIG. 2 shows seven hypothetical candidates represented by horizontal bars 208. As illustrated by the length of bars 208, the full correlation profile values profile(s,lag) for each of the seven candidates are generated based on correlations for 4,096 chips of received data.

Figure 3:
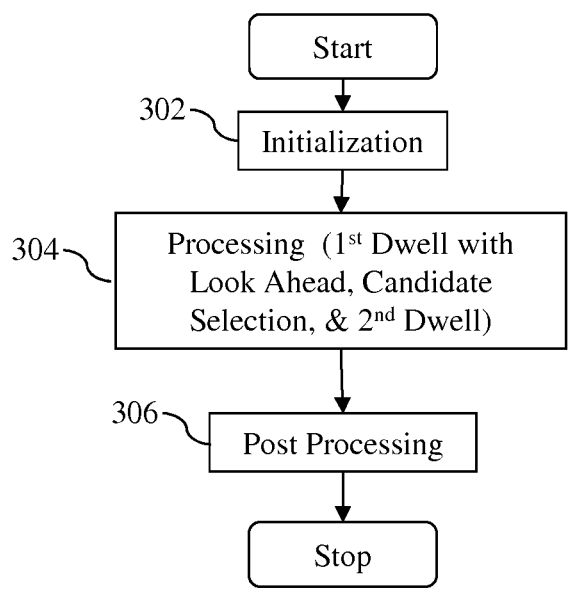
FIG. 3 shows a simplified flow diagram of a chunk-based double-dwell preamble-detection method according to one embodiment of the present invention that may be implemented by the PRACH detection module in FIG. 1.

Chunk-Based Double-Dwell Preamble Detection Using Look-Ahead Data and a Fixed Candidate-Selection Threshold FIG. 3 shows a simplified flow diagram of a chunk-based double-dwell preamble-detection method 300 according to one embodiment of the invention that may be implemented by PRACH detection module 112 of FIG. 1. In general, method 300 comprises three steps: an initialization step 302, a processing step 304, and a post-processing step 306.

Upon startup, initialization step 302 is preformed to initialize various parameters (discussed further below). Once these parameters are initialized, processing step 304 processes incoming chunks $x_t$ of received data to perform three sub-steps: (i) a first dwell using look-ahead data to generate partial-profile values profile(s,lag), (ii) candidate selection from the partial-profile values profile(s,lag) using a specified fixed threshold, and (iii) a second dwell to generate full-profile values profile(s,lag) for the selected candidates. The first sub-step functions as a partial-profile value generator, the second sub-step functions as a candidate selector, and the third sub-step functions as a full profile generator.

Candidate selection may be performed for each delay lag as soon as the partial-profile value profile(s,lag) has been generated based on the specified number of correlations (e.g., 1,024), and without waiting for the profile values profile(s, lag) for all of the delays lag to be generated. Further, second-dwell processing may begin for selected candidates before the partial-profile values profile(s,lag) for all of the delays lag are generated. Thus, these sub-steps are performed sequentially for each combination of a signature s and a delay lag; however, these sub-steps are not necessarily performed sequentially for all possible combinations. For example, in some cases, candidate selection for a given combination of a signature s and a delay lag may be performed, and second-dwell processing may even begin, before first-dwell processing for another combination begins.

After the second dwell is performed for the selected candidates (i.e., processing step 304 is complete), post-processing step 306, which functions as a preamble detector, generates a preamble-detection threshold (not to be confused with the candidate-selection threshold) and compares each full-profile value profile(s,lag) to the preamble-detection threshold to determine whether or not a signature s is detected at delay lag. To further understand the operation of steps 302, 304, and 306, consider the pseudo-codes in FIGS. 4, 6, and 5, which may be used to implement steps 302, 304, and 306, respectively.

FIG. 4 shows pseudo-code 400 according to one embodiment of the present invention that may be used to implement an initialization step for chunk-based double-dwell preamble detection. Pseudo-code 400 may be used to implement initialization step 302 in chunk-based double-dwell preamble-detection method 300 of FIG. 3 or initialization steps in other chunk-based double-dwell preamble-detection methods as described below. Pseudo-code 400 initializes various parameters, including sum, num_CAS_steps, num_candidates, first_dwell_profile_counter, profile(k,lag), and profile_counter(k,lag). For ease of explanation, these parameters and their initialized values are described in further detail below in the context of the processing and post-processing steps in which they are used.

FIG. 6 shows pseudo-code 600 according to one embodiment of the present invention that may be used to implement processing step 304 in FIG. 3. In general, pseudo-code 600 is performed once for each access slot, where the maximum of (a) 4,096+max_lag chips and (b) 5,120 chips of received data are processed for the access slot. For ease of discussion, suppose that this maximum is 5,120 chips. The 5,120 chips of received data are processed using five nested loops.

The first (i.e., outermost) nested loop (beginning on line 2 and ending on line 38) is performed once for each of 5,120/M non-overlapping chunks $x_t$ of received data for an access slot, where t=1, . . . , 5,120/M and M is the number of chips in each chunk $x_t$. For simplicity, suppose M is chosen such that each access slot is split into an integer number of received data chunks $x_t$ (i.e., 5,120 chips mod M chips=0, where "mod" denotes a modulo operation).

For each chunk $x_t$, the second nested loop (beginning on line 3 and ending on line 37) is performed num_employed_signatures times, once for each different signature s employed by the system. As described above, the 3GPP standard allows for up to 16 possible signature codes, commonly referred to as the 16 Hadamard codes; however, often, only a subset of the 16 possible signature codes is employed in a given system. As used herein, the parameter k is used as a counter for the different signatures, where k=1, . . . , num_employed_signatures (i.e., ≤16), and the parameter s is the signature corresponding to the $k^{th}$ counter value (line 4).

For each signature $x_t$, the third nested loop (beginning on line 5 and ending on line 36) is performed max_lag times, once for each different possible delay lag for the cell. As used herein, the parameter lag corresponds to the number of chips delayed counting from the beginning of an access slot. Thus, for example, the $5^{th}$ lag corresponds to a delay of 5 chips. Note that the selection of each different combination of a signature code s and a delay lag corresponds to the selection of a different profile value profile(s,lag) for consideration, and hence a different sliding window (e.g., a different bar 202 in FIG. 2).

For each combination of a signature s and a delay lag, the fourth nested loop (beginning on line 6 and ending on line 35) is performed num_CAS_steps times, once for each different coherent accumulation window j (i.e., sub-window), where num_CAS_steps is the number of coherent accumulation windows j within a chunk $x_t$. In initialization pseudo-code 400 in FIG. 4, parameter num_CAS_steps is initialized to M/CAS as shown in line 3. Each time that the fourth nested loop is performed, the coherent accumulation value CA and a coherent accumulation value for the look-ahead data CA_lookahead (discussed below) are initialized to zero (line 7).

For each different coherent accumulation window j, the fifth nested loop (beginning on line 8 and ending on line 30) is performed once for each chip n of received data within a coherent accumulation window j, where n=0, . . . , CAS-1, and CAS is the number of chips in a coherent accumulation window. Each time the fifth loop is performed, pseudo-code 600 converts (i) chip index n into chip index i (line 9), where i indicates the relative position of chip n within the entire preamble pattern (as opposed to merely within the coherent accumulation window j), and (ii) chip index i into chip index $i_0$ (line 10), where $i_0$ indicates the position of the chip relative to the beginning of a chunk $x_t$ taking into account the current lag. Further, each time the fifth loop is performed, pseudo-code 600 determines whether to (i) use a chip of the current chunk $x_t$ of received data for first-dwell processing, (ii) perform candidate selection, (iii) use a chip of the current chunk $x_t$ of received data for second-dwell processing, or (iv) not use a chip of the current chunk $x_t$ of received data at all (e.g., when it has been determined that the selected signature s and delay lag combination is not a candidate).

The determination as to whether or not first-dwell processing is to be performed is first based on a comparison of a counter value profile_counter(k,lag) to a threshold first_dwell_profile_counter (line 12). The counter value profile_counter(k,lag), which keeps a count of the number of chips accumulated for the first dwell for signature k and delay lag, is initialized to zero in line 11 of initialization pseudo-code 400 of FIG. 4. The threshold first_dwell_profile_counter is set equal to a specified number num_first_dwell of chips that are to be used to generate each partial-profile value profile(k,lag) for the first dwell as shown in line 5 of initialization pseudo-code 400 of FIG. 4. For example, in FIG. 2, the number num_first_dwell of chips that are used to generate each partial-profile value profile(k,lag) for the first dwell is equal to 1,024 chips.

If profile_counter(k,lag) is smaller than first_dwell_profile_counter, then the determination as to whether or not first-dwell processing is to be performed is further based on two bounds-checking determinations. In particular, a first bounds-checking determination (line 13) is made as to whether or not chip index $i_0$ is within the bounds of the current chunk $x_t$ by determining whether or not $0 \le i_0 < M$. If this is true, then the coherent accumulation value CA is updated (line 14) by correlating the chip of current chunk $x_t$ at index $i_0$ with the corresponding chip of the preamble pattern $c_{pre,n,s}[i]$, where the symbol "+=" indicates that the right side of the equation is added to the previous coherent accumulation value CA. In addition, profile_counter(k, lag), which is increased every time a chip of received data is correlated during first-dwell processing, is increased by a value of one (line 15).

If $0 \le i_0 < M$ is not true, then the second bounds-checking determination (line 16) is made as to whether or not chip index $i_0$ is within the bounds of the next chunk $x_{t+1}$ (i.e., the look-ahead chunk) by determining whether or not $M \le i_0 < 2 \times M$. If this is true, then the coherent accumulation value CA_lookahead for the look-ahead data is updated (line 18) by correlating the chip of current chunk $x_t$ at index $i_0$ with the corresponding chip of the preamble pattern $c_{pre,n,s}[i]$, and profile_counter(k,lag) is increased by a value of one (line 19). Note that the coherent accumulation value CA_lookahead for the look-ahead data is used for accumulating data during the first dwell, but not the second dwell. If neither of these two bounds-checking determinations is true, then first-dwell processing is not performed for the current chip n.

If, in line 12, profile_counter(k,lag) is not less than first_dwell_profile_counter, then a determination is made as to whether or not to perform candidate selection. In particular, if profile_counter(k,lag) is equal to first_dwell_profile_counter, then the profile value profile(k,lag), which is initialized to zero in line 10 of initialization pseudo-code 400 of FIG. 4, is added to the absolute value of the sum of the coherent accumulation value CA and the coherent accumulation value CA_lookahead for the look-ahead data. If the resulting sum is greater than a specified threshold value threshold4_1, then a candidate is detected for signature k at delay lag (line 23) and candidate(k,lag) is set equal to one. In this case, a candidate counter num_candidates, which is initialized to zero in line 4 of initialization pseudo-code 400 of FIG. 4, is increased by candidate(k,lag) (line 24), and profile_counter(k,lag) is increased by one. If the resulting sum is not greater than specified threshold value threshold4_1, then the partial-profile value profile(k,lag) is not a candidate (i.e., candidate(k,lag) remains equal to zero) and the candidate counter num_candidates and profile counter profile_counter (k,lag) are not increased.

If first-dwell processing and candidate selection are not to be performed, then a determination is made as to whether or not to perform second-dwell processing. In particular, if a candidate has been identified and if $0 \le i_0 < M$, then the coherent accumulation value CA is updated (line 28) by correlating the chip of current chunk $x_t$ at index $i_0$ with the corresponding chip of the preamble pattern $c_{pre,n,s}[i]$. Otherwise, second-dwell processing is not performed.

After performing first-dwell processing or second-dwell processing, non-coherent accumulation is performed (line 31) to update the profile value profile(k,lag) by adding the absolute value of coherent accumulation value CA to the previous profile value profile(k,lag). Further, if signature s at delay lag corresponds to a candidate, then the absolute value of coherent accumulation value CA is added to a value sum (lines 32 and 33), which is initialized to zero in line 2 of initialization pseudo-code 400 of FIG. 4 and which is used for post processing. After all 5,120 chips of received data are processed for the access slot, post processing is performed to detect a transmitted signature s.

FIG. 5 shows pseudo-code 500 according to one embodiment of the present invention that may be used to implement a post-processing step for chunk-based double-dwell preamble detection. Pseudo-code 500 may be used to implement post-processing step 306 in chunk-based double-dwell preamble-detection method 300 of FIG. 3 or post-processing steps in other chunk-based double-dwell preamble-detection methods as described below. The detection threshold threshold 2 is calculated based on the value sum, the counter num_candidates, and a constant C2 as shown in line 2, where constant C2 may be determine heuristically. Each possible combination of a signature s (lines 3-4) and delay lag (line 5) is considered. If the combination corresponds to a selected candidate(k,lag) and if the corresponding profile value profile (k,lag) is greater than detection threshold2, then a signature is detected at delay lag (line 6). Otherwise, a signature is not detected.

Chunk-Based Double-Dwell Preamble Detection Using Look-Ahead Data and a Dynamically Selected Candidate Threshold When using a dynamically selected candidate-selection threshold, the threshold may be selected individually for each signature s (i.e., a different threshold may be selected for each signature s) or globally for all possible combinations of signatures s and delays lag. When selecting the threshold individually for each signature s, each threshold may be selected (i) after generating partial-profile values for all delays lag for the signature s, without waiting for the other signatures to be processed or (ii) after generating partial-profile values for all delays lag for all signatures s (i.e., after the first dwell is complete).

Figure 7:
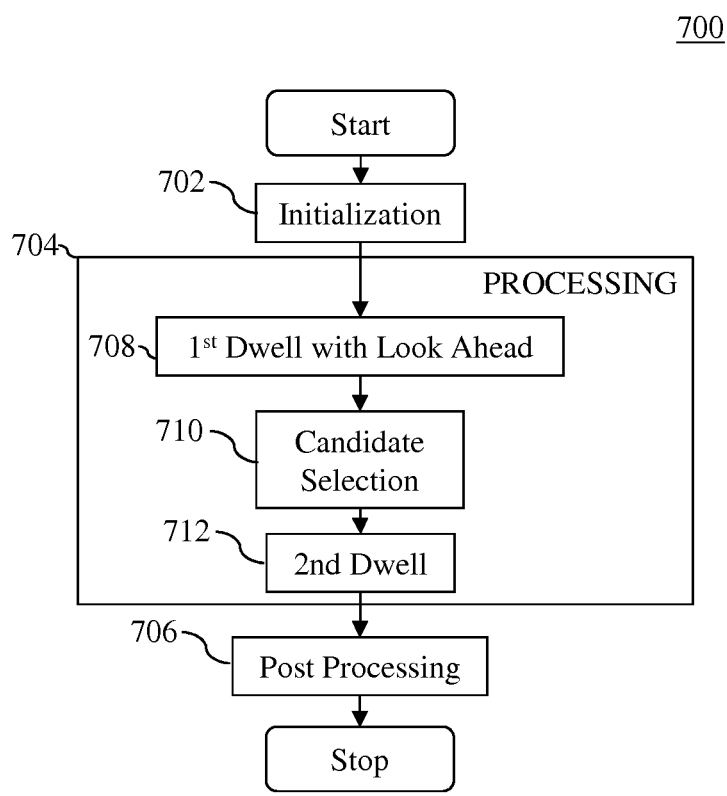
FIG. 7 shows a simplified block diagram of a chunk-based double-dwell preamble-detection method according to another embodiment of the present invention that may be implemented by the PRACH detection module of FIG. 1.

FIG. 7 shows a simplified block diagram of a chunk-based double-dwell preamble-detection method 700 according to another embodiment of the present invention that may be implemented by PRACH detection module 112 of FIG. 1. Method 700 comprises an initialization step 702, which is analogous to initialization step 302 of FIG. 3 and may be implemented using pseudo-code 400 of FIG. 4, and a post-processing step 706, which is analogous to post-processing step 306 of FIG. 3 and may be implemented using pseudo-code 500 of FIG. 5. Further, similar to method 300, method 700 comprises a processing step 704, which performs first-dwell processing, candidate selection, and second-dwell processing.

However, unlike method 300, first-dwell processing 708, candidate selection 710, and second-dwell processing 712 of processing step 704 are performed sequentially for all possible combinations of signatures s and delays lag. In other words, first-dwell processing 708 is completed for all combinations before candidate selection 710 begins for any combinations, and candidate selection 710 is completed for all combinations before second-dwell processing 712 begins for any combinations. Note that first-dwell processing 708 functions as a partial-profile value generator, candidate selection 710 functions as a candidate selector, and second-dwell processing 712 functions as a full profile generator. To further understand the operation of processing sub-steps 708, 710, and 712, consider FIGS. 8 to 11.

FIG. 8 shows pseudo-code 800 according to one embodiment of the present invention that may be used to implement first-dwell processing sub-step 708 in FIG. 7. Pseudo-code 800 has five nested loops, which are similar to the five nested loops in pseudo-code 600 of FIG. 6, with one notable exceptions. Specifically, the fifth nested loop (beginning on line 8 and ending on line 25) excludes the candidate-selection and second-dwell sub-steps that are performed on lines 21-29 of pseudo-code 600. Thus, the processing performed by pseudo-code 800 is for only first-dwell processing. At the completion of pseudo-code 600, all of the partial-profile values profile(k, lag) for the first dwell have been updated using all of the chunks $x_l$ corresponding to the current access slot.

FIG. 9 shows pseudo-code 900 according to one embodiment of the present invention that may be used to implement candidate-selection sub-step 710 in FIG. 7. Pseudo-code 900 performs candidate selection individually for each signature s by (i) dynamically generating a candidate-selection threshold for the signature s and (ii) comparing the partial-profile values profile(k,lag) for all possible combinations of the signature s and delays lag to the candidate-selection threshold. For each signature s (lines 2 and 3), the partial-profile values profile (k,lag) for all delays are sorted in descending order (line 5). Then the candidate-selection threshold threshold4_2(s) is selected based on a specified percentage of the partial-profile values profile(k,lag) for signature s (line 7). For example, to select partial-profile values profile(k,lag) that have absolute values in the highest ten percent of the set of partial-profile values profile(k,lag), a first_dwell_fraction=0.1 is used. Then, for signature s, the partial-profile values profile(k,lag) for each delay lag are compared to the candidate-selection threshold threshold4_2(s) (lines 8-10). If a partial-profile value profile(k,lag) is greater than the threshold, then the partial-profile value profile(k,lag) is selected as a candidate. Otherwise, the partial-profile value profile(k,lag) is not selected as a candidate.

FIG. 10 shows pseudo-code 1000 according to another embodiment of the present invention that may be used to implement candidate-selection sub-step 710 in FIG. 7. Pseudo-code 1000 performs candidate selection globally for all signatures s by (i) dynamically generating a candidate-selection threshold for all signatures s and (ii) comparing the partial-profile values profile(k,lag) for all possible combinations of the signatures s and delays lag to the candidate-selection threshold. For all signatures s, the partial-profile values profile(k,lag) for all delays are sorted in descending order (line 3). The candidate-selection threshold threshold4_3 is selected based on a specified percentage of the partial-profile values profile(k,lag) for all signatures s (line 5). Then, the partial-profile values profile(k,lag) for all possible combination of signatures s and delays lag are compared to the candidate-selection threshold threshold4_3 (lines 6-11). If a partial-profile value profile(k,lag) is greater than the threshold, then the partial-profile value profile(k,lag) is selected as a candidate. Otherwise, the partial-profile value profile(k,lag) is not selected as a candidate. After all of the candidates are selected, second-dwell processing is performed for the candidates to generate full correlation profile values profile(k,lag) for the candidates.

FIG. 11 shows pseudo-code 1100 according to one embodiment of the present invention that may be used to implement second-dwell processing sub-step 712 in FIG. 7. Pseudo-code 1100 has five nested loops, which are similar to the five nested loops of pseudo-code 600 of FIG. 6, with one notable exception. In particular, the fifth nested loop (beginning on line 8 and ending on line 21) excludes the first-dwell and candidate-selection sub-steps that are performed on lines 12-25 of pseudo-code 600. Thus, the processing performed by pseudo-code 1100 is for only second-dwell processing. At the completion of pseudo-code 1100, full-profile values profile(k,lag) for all of the selected candidates have been generated using all of the chunks $x_l$ corresponding to the current access slot. Referring back to FIG. 7, post-processing step 706 is then performed to detect the transmitted signature s.

Chunk-Based Double-Dwell Preamble Detection without Using Look-Ahead Data

As described above, candidate selection is preferably made for partial-profile values profile(s,lag) that are generated based on the same number of chips. Thus, the embodiments described above utilized look-ahead data to ensure that the partial-profile values profile(s,lag) are generated based on the same number of chips. As an alternative to using look-ahead data, some data may be excluded from the partial-profile values profile(s,lag) to ensure that the partial-profile values profile(s,lag) are generated based on the same number of chips. To further understand this point, consider FIG. 12.

Figure 12:
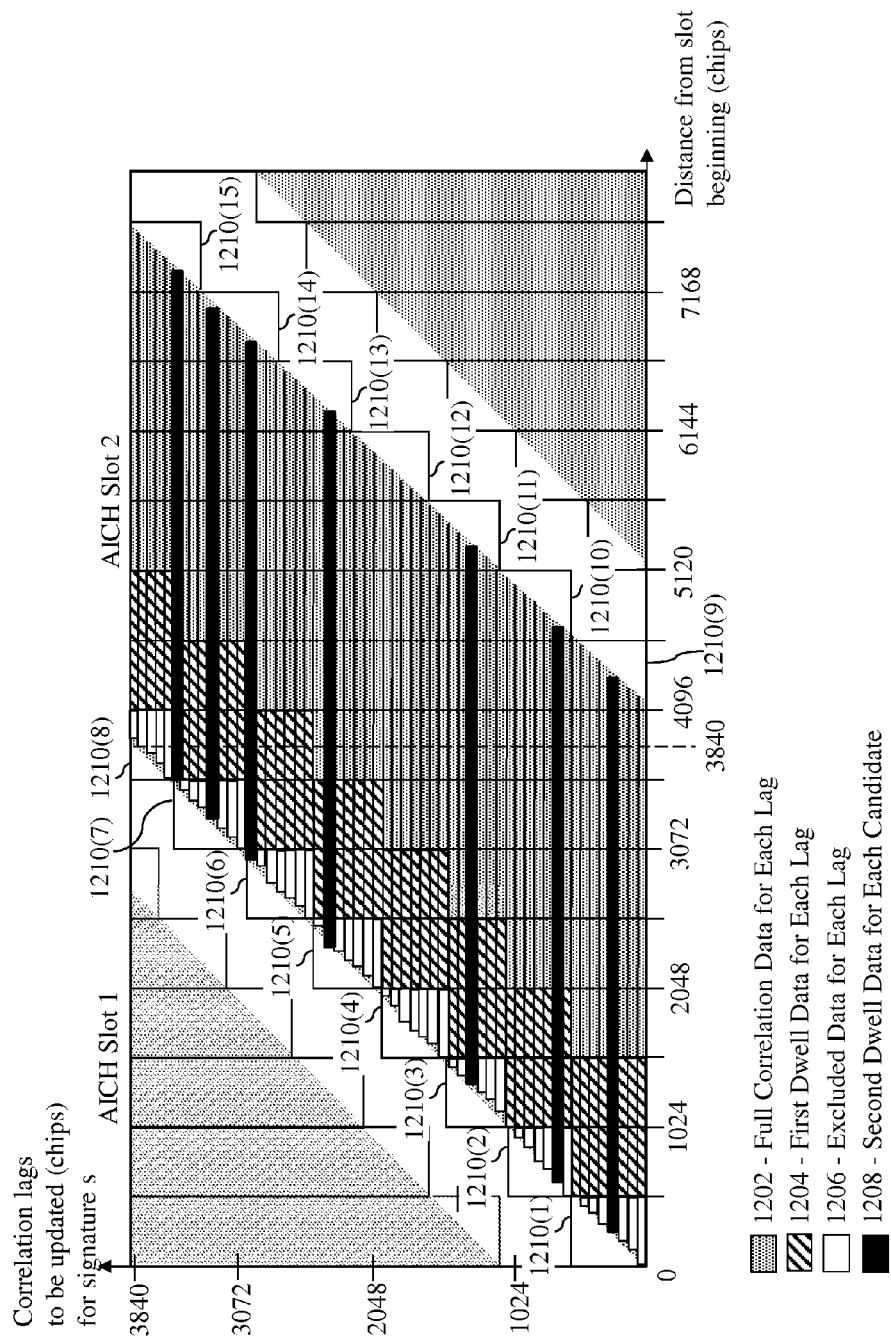
FIG. 12 is a graphical representation of an exemplary double-dwell preamble detection according to one embodiment of the present invention that does not use look-ahead data.

FIG. 12 is a graphical representation of an exemplary double-dwell preamble detection according to one embodiment of the present invention that does not use look-ahead data. The exemplary double-dwell preamble detection shown in FIG. 12 is similar to that shown in FIG. 2. For instance, the chip indexes i of the received data relative to the beginning of an access slot (i.e., AICH slot 2) are plotted along the horizontal axis, and the delays lag in chips for which correlations are performed (i.e., for which profile values are generated) are plotted along the vertical axis. Further, each horizontal bar 1202 illustrates the received data that is needed when a full-profile value profile(s,lag) for a delay lag is generated, each vertical rectangle 1210 illustrates the particular profile values profile(s,lag) that are updated for a chunk $x_l$ of received data, each horizontal bar 1204 illustrates the chips of received data that may be used to generate a partial-profile value profile(s, lag) for one delay lag during the first dwell, and each horizontal bar 1208 illustrates the chips of received data that are used to generate a full correlation profile values profile(s,lag) for a hypothetical candidate.

However, rather than using look-ahead data 206 in the first-dwell processing, the exemplary double-dwell preamble detection of FIG. 12 excludes data 1206 from the generation of the partial-profile values profile(s,lag) to ensure that the partial-profile values profile(s,lag) are generated based on the same number (e.g., 1,024) of chips. Thus, for example, for a chunk size M of 512 chips and delay lag=1 (on the vertical axis), chips 513 through 1,536 (along the horizontal axis) are used to generate a partial-profile value profile(s,0) for the first dwell, and chips 1 through 512 are excluded.

Similar to the embodiments described above that use look-ahead data, embodiments that do not use look-ahead data may be implemented using either a specified fixed candidate-selection threshold or a dynamically selected candidate-selection threshold. Further, in those embodiments that use a dynamically selected candidate-selection threshold, the threshold may be dynamically selected individually for each signature s or globally for all signatures s in a manner similar to that described above.

Figure 13:
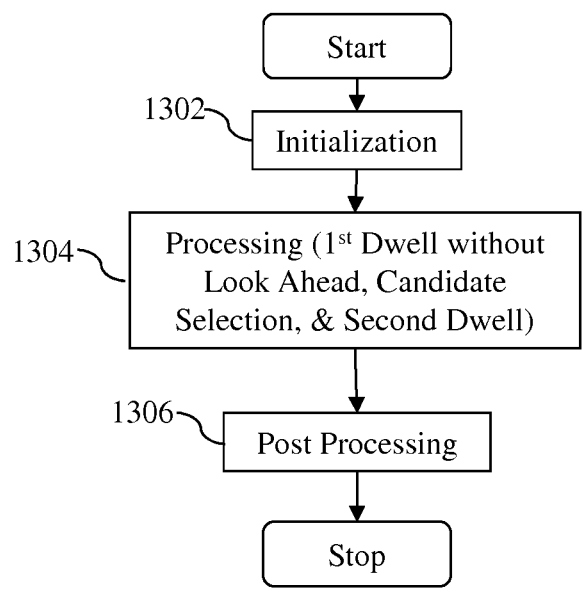
FIG. 13 shows a simplified flow diagram of a chunk-based double-dwell preamble-detection method according to yet another embodiment of the present invention that may be implemented by the PRACH detection module in FIG. 1.

Chunk-Based Double-Dwell Preamble Detection that Excludes Data and Uses a Fixed Candidate-Selection Threshold FIG. 13 shows a simplified flow diagram of a chunk-based double-dwell preamble-detection method 1300 according to yet another embodiment of the present invention that may be implemented by PRACH detection module 112 of FIG. 1. Method 1300 comprises an initialization step 1302, which is analogous to initialization step 302 of FIG. 3 and may be implemented using pseudo-code 400 of FIG. 4, and a post-processing step 1306, which is analogous to post-processing step 306 of FIG. 3 and may be implemented using pseudo-code 500 of FIG. 5. Similar to method 300, method 1300 comprises a processing step 1304, which performs first-dwell processing, candidate selection, and second-dwell processing. Further, similar to method 300, first-dwell processing functions as a partial-profile value generator, candidate selection functions as a candidate selector, and second-dwell processing functions as a full profile generator. However, unlike the first-dwell sub-step in method 300, the first-dwell sub-step in method 300 is performed without using look-ahead data. To further understand the operation of processing 1304 consider FIG. 14.

FIG. 14 shows pseudo-code 1400 according to one embodiment of the present invention that may be used to implement processing step 1304 in FIG. 13. In general, pseudo-code 1400 is performed once for each access slot, where a maximum of (a) 4,096+max_lag chips and (b) 5,120 chips of received data are processed for the access slot. Again, for ease of discussion, suppose that this maximum is 5,120 chips. Similar to pseudo-code 600 of FIG. 6, the 5,120 chips of received data are divided into 5,120/M non-overlapping chunks $x_t$ of received data, and the chunks $x_t$ of received data are processed using a loop, which begins on line 2 and ends on line 41. However, unlike pseudo-code 600, pseudo-code 1400 is divided into two portions, each portion comprising a set of nested loops. The first portion of pseudo-code 1400, which begins on line 3 and ends on line 29 performs accumulation operations for the first and second dwells. The second portion, which begins on line 30 and ends on line 40, performs candidate selection.

The first and second dwells in pseudo-code 1400 are performed in a manner similar to that of the first and second dwells in pseudo-code 300 of FIG. 3, with two notable exceptions. First, since pseudo-code 1400 does not employ look-ahead data, pseudo-code 1400 does not generate a coherent accumulation value CA_lookahead for the look ahead data. Thus, pseudo-code 1400 does not include lines 16 through 19 of pseudo-code 300, which perform bounds checking for the look-ahead data and update the coherent accumulation value CA_lookahead. Second, the bounds-checking operation that is performed for the first dwell (line 13) is a bit different from the bounds-checking operation for the first dwell in line 13 of pseudo-code 300. Specifically, pseudo-code 1400 determines whether or not $0 \le i_0 < M$ and $i_0 < i$. This bounds-checking operation ensures that the chips that should be excluded during the first dwell (e.g., bars 1206 in FIG. 12) are in fact excluded. If both of these are true, then the coherent accumulation value CA is updated (line 15) by correlating the chip of current chunk $x_t$ at index $i_0$ with the corresponding chip of the preamble pattern $c_{pre,n,s}[i]$, and profile_counter(k,lag) is increased by a value of one (line 16). If, on the other hand, one or both of these is false, then the coherent accumulation value CA is not updated, and profile_counter(k,lag) is not increased.

The candidate selection in pseudo-code 1400 is performed for each possible combination of signatures s and delays lag in a manner similar to that in lines 21-25 of pseudo-code 300, except that this portion of pseudo-code 1400 is broken out from the first and second dwells, as opposed to being performed in-line with the first and second dwells.

Figure 15:
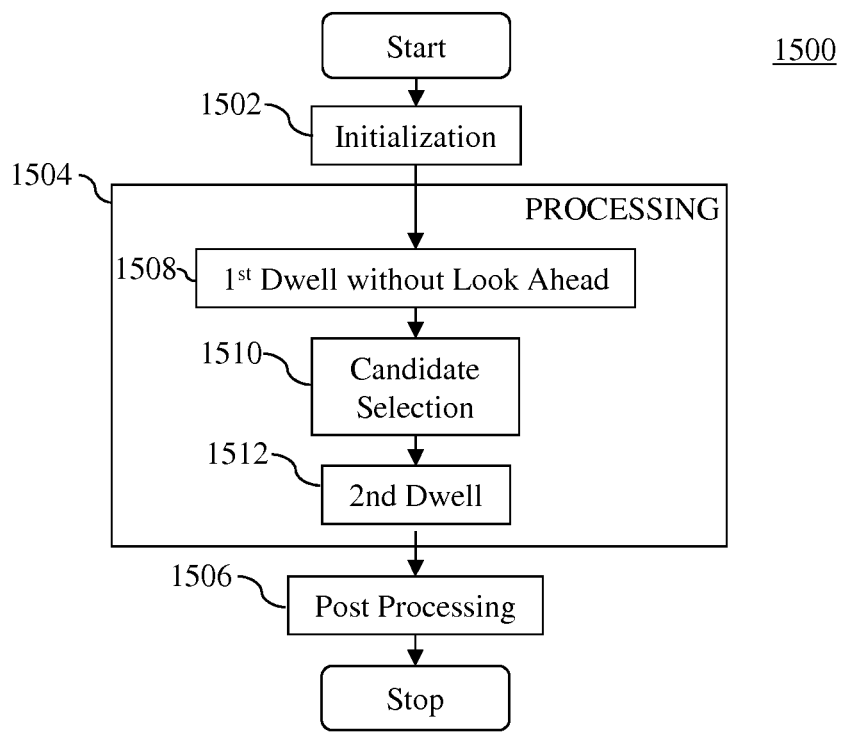
FIG. 15 shows a simplified flow diagram of a chunk-based double-dwell preamble-detection method according to even yet another embodiment of the present invention that may be implemented by the PRACH detection module in FIG. 1.

Chunk-Based Double-Dwell Preamble Detection that Excludes Data and Uses a Dynamically Selected Candidate-Selection Threshold FIG. 15 shows a simplified flow diagram of a chunk-based double-dwell preamble-detection method 1500 according to even yet another embodiment of the present invention that may be implemented by PRACH detection module 112 of FIG. 1. Method 1500 comprises an initialization step 1502, which is analogous to initialization step 302 of FIG. 3 and may be implemented using pseudo-code 400 of FIG. 4, and a post-processing step 1506, which is analogous to post-processing step 306 of FIG. 3 and may be implemented using pseudo-code 500 of FIG. 5. Similar to method 700, method 1500 comprises a processing step 1504, which performs first-dwell processing 1508, candidate selection 1510, and second-dwell processing 1512 sequentially. First-dwell processing 1508 functions as a partial-profile value generator, candidate selection 1510 functions as a candidate selector, and second-dwell processing 1512 functions as a full profile generator.

FIG. 16 shows pseudo-code 1600 according to one embodiment of the present invention that may be used to implement first-dwell sub-step 1508 in FIG. 15. Pseudo-code 1600 performs first-dwell processing in a manner similar to that of pseudo-code 1400 of FIG. 14. However, unlike pseudo-code 1400, pseudo-code 1600 does not implement second-dwell processing or candidate selection. Thus, lines 18 through 21 and lines 30 through 40 of pseudo-code 1400 are eliminated from pseudo-code 1600.

Referring back to FIG. 15, candidate selection 1510 may be implemented in a manner similar to that of candidate selection 710 in FIG. 7, and may be implemented using, for example, candidate-selection pseudo-codes 900 in FIG. 9 and 1000 in FIG. 10. Second-dwell processing 1512 may be implemented in a manner similar to that of second-dwell processing 712 in FIG. 7, and may be implemented using, for example, candidate-selection pseudo-code 1100 in FIG. 11.

Alternative embodiments of the present invention may be implemented using the Fast Hadamard Transform. Preferably, in such embodiments, the Fast Hadamard Transform is used in the first dwell to efficiently update partial profile values for all 16 signatures. In the second dwell, however, the usefulness of the Fast Hadamard Transform might depend on how the candidates are selected.

For example, if candidates are selected by considering each possible combination of a signature s and delay lag as described above, then the Fast Hadamard Transform might not be advantageous. In such embodiments, candidates might not be selected for all 16 signatures at a particular delay lag. Thus, the parallelization benefits of the Fast Hadamard Transform may be lost, and use of the Fast Hadamard Transform might not be advantageous in the second dwell.

As another example, candidates may be selected by considering each delay lag and selecting 16 candidates, one candidate for each signature s, at the detected delay lag. In such embodiments, the parallelization benefits of the Fast Hadamard Transform may be realized, and use of the Fast Hadamard Transform could be advantageous in the second dwell.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values stored in a non-transitory recording medium generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A receiver-implemented method for detecting a preamble in a data signal transmitted from a transmitter and received at the receiver after a propagation delay, the method comprising:
    (a) generating a plurality of partial-profile values based on a first set of one or more chunks of the data signal, wherein:
        each chunk comprises multiple chips of the data signal;
        each partial-profile value corresponds to a different combination of (i) a possible preamble of a set of different possible preambles and (ii) a possible propagation delay of a set of different possible propagation delays; and
        the plurality of partial-profile values corresponds to a set of the different combinations;
    (b) selecting a subset of the set of the different combinations as two or more candidates based on the partial-profile values, wherein:
        each candidate corresponds to a different combination of a possible preamble and a possible propagation delay; and
        two or more of the plurality of partial-profile values are generated in step (a) before selecting any of the two or more candidates in step (b);
    (c) generating two or more full-profile values based on a second set of chunks of the data signal, wherein each full-profile value corresponds to a different selected candidate; and
    (d) detecting the preamble based on the two or more full-profile values.

2. The receiver-implemented method of claim 1, wherein the second set of chunks includes the first set of chunks and one or more additional chunks.

3. The receiver-implemented method of claim 1, wherein two or more of the plurality of partial-profile values are generated in step (a) for a single preamble and two or more different possible propagation delays before selecting any of the two or more candidates in step (b).

4. The receiver-implemented method of claim 1, wherein the two or more candidates are selected in step (b) based on a comparison of each partial-profile value to a candidate-selection threshold.

5. The receiver-implemented method of claim 4, wherein the candidate-selection threshold is a specified fixed threshold.

6. The receiver-implemented method of claim 5, wherein at least one of the partial-profile values is compared to the candidate-selection threshold before all of the partial-profile values are generated in step (a).

7. The receiver-implemented method of claim 4, wherein the candidate-selection threshold is a dynamically selected threshold.

8. The receiver-implemented method of claim 7, wherein the candidate-selection threshold is dynamically selected for all of the possible preambles based on partial-profile values corresponding to all of the different combinations.

9. The receiver-implemented method of claim 8, wherein the candidate-selection threshold is dynamically selected such that only a specified percentage of the partial-profile values corresponding to all of the possible preambles exceeds the candidate-selection threshold.

10. The receiver-implemented method of claim 7, wherein the candidate-selection threshold is independently dynamically selected for each possible preamble based on partial-profile values corresponding to all of the different combinations of (i) the possible preamble and (ii) the possible propagation delays, such that the candidate-selection thresholds are different for at least two different possible preambles.

11. The receiver-implemented method of claim 10, wherein the candidate-selection threshold is independently dynamically selected for each possible preamble such that only a specified percentage of the partial-profile values corresponding to all of the different combinations of (i) the possible preamble and (ii) the possible propagation delays exceeds the candidate-selection threshold.

12. The receiver-implemented method of claim 1, wherein generating the plurality of partial-profile values in step (a) comprises:
    (a1) generating a first set of two or more of the plurality of partial-profile values based on a first chunk in the first set of chunks; and (a2) generating a second set of two or more of the plurality of partial-profile values based on a second chunk in the first set of chunks, different from the first chunk, wherein:

the second set of two or more partial-profile values is different from the first set of two or more partial-profile values; and the two or more partial-profile values in the first set are generated based on the first chunk before any of the two or more partial-profile values in the second set are generated based on the second chunk.

13. The method of claim 12, wherein step (a) further comprises:

(a3) updating the first set of two or more of the plurality of partial-profile values based on the second chunk.

14. The receiver-implemented method of claim 1, wherein the two or more candidates are selected based on partial-profile values that are each generated based an equal number of chips.

15. An apparatus for detecting a preamble in a data signal transmitted from a transmitter and received at the receiver after a propagation delay, the apparatus comprising:

a partial-profile value generator configured to generate a plurality of partial-profile values based on a first set of one or more chunks of the data signal, wherein:

each chunk comprises multiple chips of the data signal;

each partial-profile value corresponds to a different combination of (i) a possible preamble of a set of different possible preambles and (ii) a possible propagation delay of a set of different possible propagation delays; and the plurality of partial-profile values corresponds to a set of the different combinations;

a candidate selector configured to select a subset of the set of the different combinations as two or more candidates based on the partial-profile values, wherein:

each candidate corresponds to a different combination of a possible preamble and a possible propagation delay; and two or more of the plurality of partial-profile values are generated before selecting any of the two or more candidates;

a full-profile value generator configured to generate two or more full-profile values based on a second set of chunks of the data signal, wherein each full-profile value corresponds to a different selected candidate; and a preamble detector configured to detect the preamble based on the two or more full-profile values.

16. The apparatus of claim 15, wherein the candidate selector is configured to select the two or more candidates based on a comparison of each partial-profile value to a candidate-selection threshold.

17. The apparatus of claim 16, wherein the candidate-selection threshold is a specified fixed threshold.

18. The apparatus of claim 16, wherein the candidate-selection threshold is a dynamically selected threshold.

19. The apparatus of claim 18, wherein the candidate selector is configured to dynamically select the candidate-selection threshold for all of the possible preambles based on partial-profile values corresponding to all of the different combinations.

20. The apparatus of claim 18, wherein the candidate selector is configured to dynamically select the candidate-selection threshold independently for each possible preamble based on partial-profile values corresponding to all of the different combinations of (i) the possible preamble and (ii) the possible propagation delays, such that the candidate-selection thresholds are different for at least two different possible preambles.

21. The apparatus of claim 15, wherein the partial-profile value generator generates the plurality of partial-profile values by:

(a1) generating a first set of two or more of the plurality of partial-profile values based on a first chunk in the first set of chunks; and (a2) generating a second set of two or more of the plurality of partial-profile values based on a second chunk in the first set of chunks, different from the first chunk, wherein:

the second set of two or more partial-profile values is different from the first set of two or more partial-profile values; and the partial-profile value generator generates the two or more partial-profile values in the first set based on the first chunk before generating any of the two or more partial-profile values in the second set based on the second chunk.

* * * * *